July 30, 1968  S. C. HART-STILL  3,394,434
INJECTION MOULDING MACHINE LOCKING DEVICE
Filed Dec. 2, 1965  3 Sheets-Sheet 1

INVENTOR
S. C. Hart-Still
BY
ATTORNEY

United States Patent Office 3,394,434
Patented July 30, 1968

3,394,434
INJECTION MOULDING MACHINE LOCKING DEVICE
Sydney Charles Hart-Still, 79A St. Marks Road, Bush Hill Park, Enfield, England
Filed Dec. 2, 1965, Ser. No. 511,079
Claims priority, application Great Britain, Dec. 8, 1964, 49,911/64
5 Claims. (Cl. 18—30)

ABSTRACT OF THE DISCLOSURE

An improved moulding machine of the type having opposed platens secured together during moulding by locking means engaging tension members which in a conventional moulding machine are provided in the form of spaced tie-rods, but which in the present invention are provided in the form of an opposed pair of lateral plates.

---

This invention relates to injection moulding machines.

According to the present invention, in an injection moulding machine having opposed horizontal platens arranged for mould opening and closing movement along a vertical direction, the platens are secured in the mould-closed position by means of a plurality of generally horizontal pins each of which is axially movable to engage in a corresponding bore in a first of the platens and an aligned bore in an extension of the second platen.

Preferably, adjustment means are provided to compensate for any radial clearance between the pins and the corresponding bores. Such adjustment means are conveniently provided in the form of a metal plate secured in a fluid tight manner across the face of one platen forming a cavity therewith to which high pressure fluid may be introduced to cause the metal plate to flex towards the other platen.

The extension of the second platen, when this is the uppermost of the pair, may comprise a pair of dependent plates extending from opposite edges of the said platen, each plate being provided adjacent its lower edge with a row of bores aligned with the bores in the lower platen when the two platens are in the mould-closed position.

Where the requisite size of a given upper mould half is suitable, for instance in moulding very deep articles, the upper mould half itself may be used as the upper platen of the machine, no separate upper platen then being necessary. In such a situation the pin-engaging extensions may be attached to the upper mould half by suitable shear members.

Injection of thermoplastics material in a machine according to the invention preferably takes place in the plane of separation of the mould halves, and may conveniently be effected from two or more points around the periphery of the mould.

Figure 1:
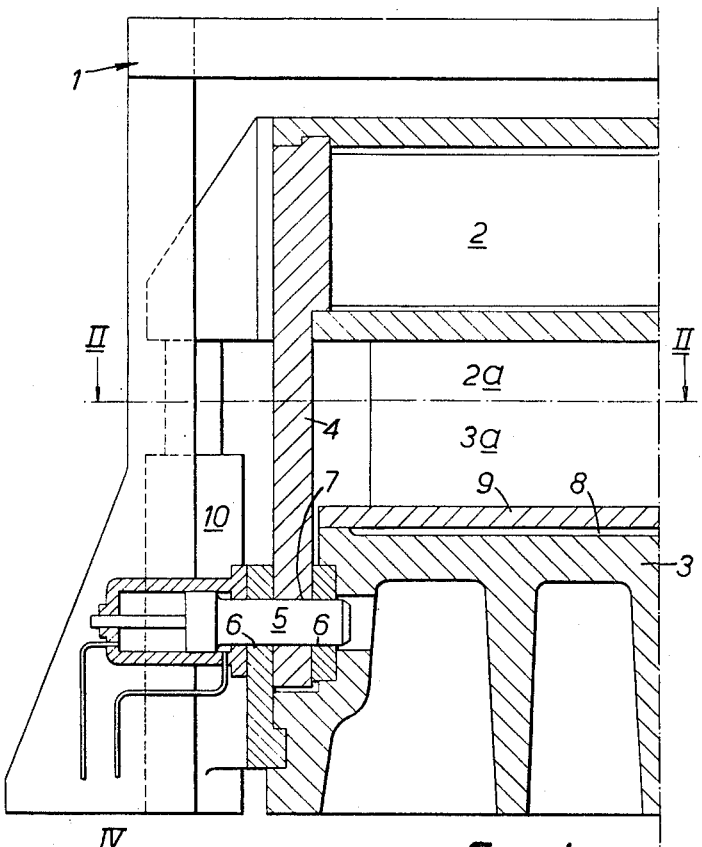
Figure 3:
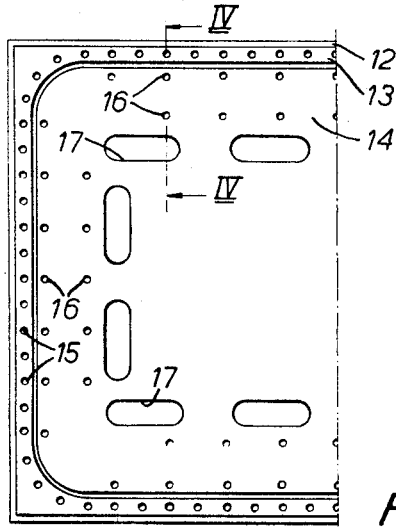
Figure 4:
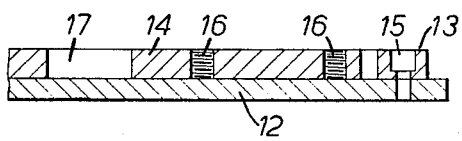
Figure 2:
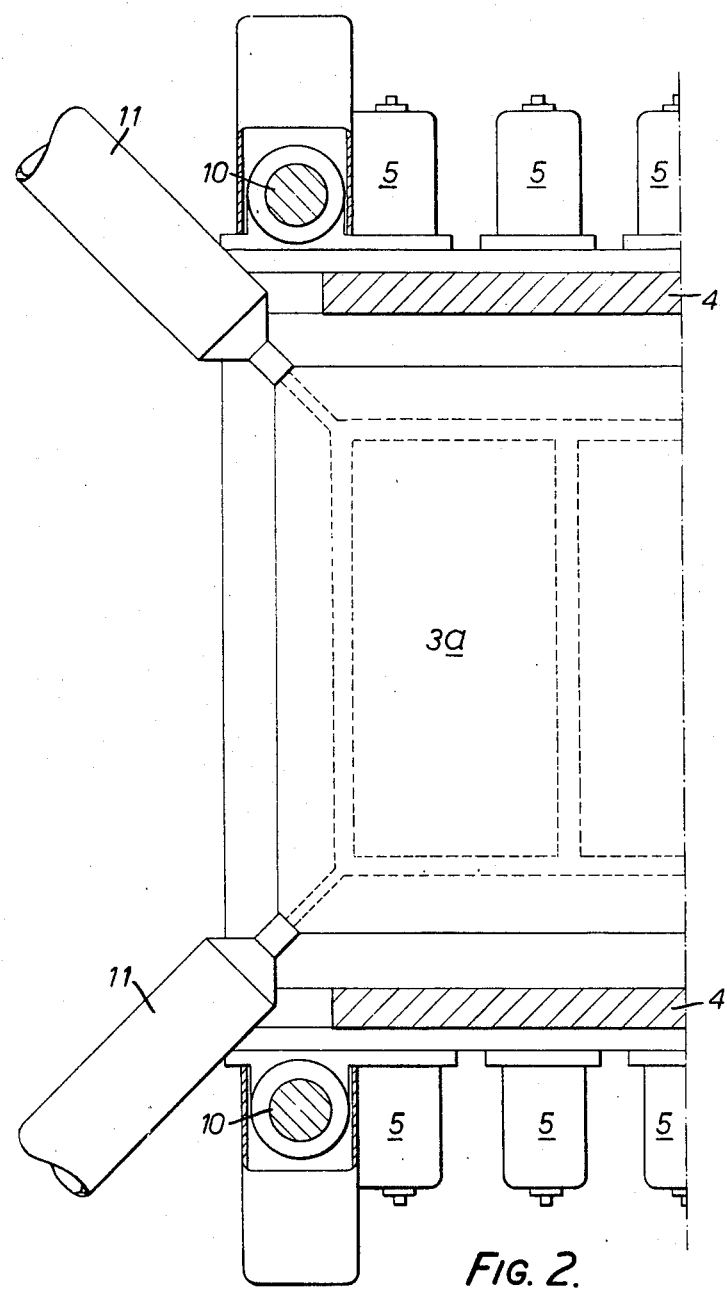
Figure 5:
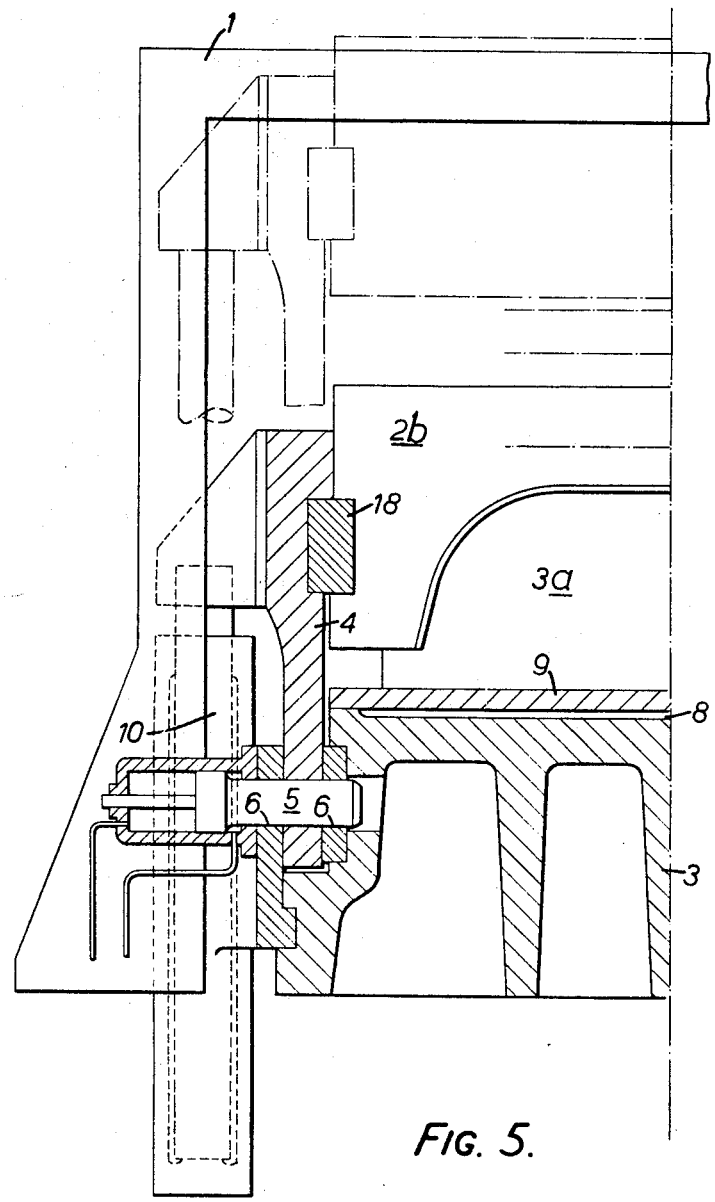

The invention will now be described in greater detail with reference to the accompanying drawings, of which:

FIGURE 1 shows a vertical cross-section of one half of a preferred embodiment of the invention, the other half being identical therewith, FIGURE 2 shows a section taken on the line II—II of FIGURE 1, FIGURE 3 shows on an enlarged scale a plan view of one half of the flex plate used on the lower platen of the embodiment of FIGURES 1 and 2, the other half being identical therewith, FIGURE 4 shows a section taken on the line IV—IV of FIGURE 3, and FIGURE 5 illustrates a modified embodiment of the invention, parts similar to those shown in FIGURES 1–4 being similarly numbered.

Referring now to FIGURES 1–4, the injection moulding machine illustrated therein includes a main frame generally indicated at 1, an upper platen 2 and a lower platen 3. Mould halves 2a and 3a are shown attached to the platens 2 and 3 respectively. A pair of plates 4, one only of which is illustrated in the half-section of the drawing, depend from opposite sides of the upper platen 2 and overlap thhe lower platen 3 at their lower ends. A plurality of hydraulically operated pins 5 are disposed along opposite sides of the lower platen and each is positioned to engage in a corresponding bore 6 in the lower platen. When the upper platen is in the mould-closed position, a set of bores arranged in a row adjacent the bottom of each plate 4 is disposed in alignment with the bores 6 in the lower platen, and the pins 5 may be inserted into the aligned bores 6 and 7 to lock the two platens in position relative to each other. In order to reduce the play inherent in the locking mechanism, each bore 6 is in two parts, located in machined inserts in the lower platen on opposite sides of the corresponding plate 4. This arrangement prevents tilting of the pins 5 under load.

In spite of all precautions in the design of the pins, however, a certain small amount of clearance must be left around each pin in order that it may slide easily into the bores 6 and 7. Unless some compensation is made for this clearance, the mould halves will tend to separate under the influence of moulding pressure, thus causing dimensional inaccuracy of the moulded product and waste of moulding material in the form of excess flash. In the illustrated embodiment, the clearance is taken up by a hydraulic cushion. The upper surface of the body of the lower platen is formed with a central recess 8, and a metal flex plate 9 is fastened in a fluid-tight manner across the upstanding marginal portion of the body of the platen. A pressure fluid supply line (not shown) is provided to apply pressure to the space between the body of the platen and the flex plate.

A hydraulic jack 10 is provided at each corner of the machine for raising the upper platen to give access to the mould gap.

Injection of thermoplastics material into the mould is effected by means of four injection heads, two of which are indicated at 11 in FIGURE 2, which are disposed at the corners of the machine and arranged to inject material along the plane of separation of the mould halves 2a, 3a. This arrangement of the injection heads is possible with a vertically separating mould while still allowing access to the mould itself.

The flex plate 9 is illustrated in detail in FIGURES 3 and 4. As shown in these figures the flex plate consists of a continuous lower plate 12 to which are welded a strengthening rim 13 and a mould retaining plate 14 both welded onto the plate 12 as indicated in the drawing. A row of holes 15 is provided around the rim 13 and the adjacent portion of the plate 12 to enable the flex plate to be bolted to the body of the lower platen. The mould-retaining plate 13 is provided with tapped holes 16 for the reception of mould-retaining screws, and with slots 17 to assist the welding together of the plates 12 and 14.

The operation of the machine is as follows. Assuming that the upper platen is in the mould-closed position, the pins 5 are inserted by hydraulic pressure into the bores 6 and 7, thus locking the two platens together. High pressure is then applied to hydraulic fluid filling the space between the body of the lower platen and the flex plate, causing the latter to flex upwardly and take up any radial clearance around the pins 5. Injection of thermoplastics material into the mould cavity is then effected by the four heads 11. After injection is complete, the pressure on the hydraulic fluid is removed to release the flex plate, the pins 5 are retracted and the upper platen is lifted by the jacks 10 to give access to the mould cavity. The moulded article may then be removed from the mould from one side of the machine and placed on one side to cool completely. The upper platen 2 can then be lowered in readiness for the next moulding operation. The platen 2 will return under its own weight, the rams 10 being arranged to control its descent It will be seen that the embodiment described offers considerable advantages in the moulding and handling of large relatively flat articles. Firstly, the arrangement of the locking pins eliminates the necessity for a large diameter high pressure hydraulic ram to close the mould and maintain it completely closed during the moulding process. The only hydraulic pressure used to lock the mould halves is that applied to the hydraulic cushion constituted by the flex plate 9. This arrangement gives a clamping force equivalent to that produced by a hydraulic ram having an area equal to that of the platen. The clamping movement of the flex plate, is, however, small, so that only a small volume of fluid has to be pumped, and the function of opening and closing the mould havlves is assumed by the relatively light duty rams 10 which only have to sustain the weight of the upper platen.

The arrangement already described with reference to FIGURES 1–4 is particularly suited to applications where the mould itself is of a flat plate-like shape, such as would be used for moulding a relatively flat article. In such cases it is necessary for the upper platen to be sufficiently robust to carry the locking force experienced in use of the machine as a bending load between the top platen extensions 4. However, when the article to be moulded is of considerable depth necessitating a correspondingly deep mould, the support of a separate heavy platen is not required. Such a mould is illustrated in FIGURE 5. The top, cavity-half, of the mould is dimensioned to be used as the upper platen. The method of insertion into the machine is as follows. Without a mould in the machine the side platens 4 are attached to the four jack rams 10, and the lower half 3a of the mould is lowered from above on to the lower platen 3. The upper half 2b of the mould is then loaded in register on to lower half of the mould, and the side plates 4 are locked on to the mould half 2b by means of removable shear members 18. The operation of the machine is then identical to that described with reference to FIGURES 1–4. It will be appreciated that the arrangement illustrated in FIGURE 5 is advantageous in that it enables the machine to be considerably simplified, and therefore, cheapened and it also simplifies the mounting of large and heavy moulds in the machine.

The arrangement of four injection heads around the periphery of the mould, with the direction of injection lying in the plane of separation of the mould halves, is particularly suitable for the moulding of large articles, having a large proportion of peripheral structure, where moulding from a central position would introduce problems in the flow of moulding material in the mould cavity. Apart from simplifying the actual moulding, the arrangement also eliminates the need for a large injection head capable of injecting the whole charge of thermoplastics material, and provides for ready access to the mould from the sides of the machine. This last feature is particularly useful, in the moulding of larger, relatively flat objects, such as window frames, which have to be removed from the mould without disturbing their dimensions, and adequate space is available in the present design to allow lifting apparatus to be inserted into the mould gap from the side of the machine.

It is of course possible to adopt other injection head arrangements, for example instead of disposing four heads equally of the periphery of the mould area, it is also possible to arrange for injection from one end of the machine by one or more nozzles, or in fact in any other manner which may be called for in a particular moulding application.

I claim:
1. An improved moulding machine of the type having opposed first and second platens secured together during moulding by locking means engaging tension members, in which the improvement consists in the provision of tie members in the form of a pair of lateral plates arranged on either side of the access of the machine and which, in the closed position of the platens, extend between and overlap the first and second platens, each plate being attached along one lateral edge of the first platen and detachably secured by the locking means along the corresponding lateral edge of the second platen.

2. An injection moulding machine as claimed in claim 1 in which the locking means consists of a number of axially moveable pins arranged in alignment with corresponding bores located along the free edges of each of said lateral plates and registering bores in said second platen.

3. An injection moulding machine as claimed in claim 2 including displacement means adapted to compensate for radial clearance between the pins and the corresponding bores, said displacement means comprising a metal plate secured in a fluid tight manner around its edge to the face of one of said platens thereby defining a cavity to which high pressure fluid may be introduced to cause the metal plate to flex towards the other platen.

4. An injection moulding machine as claimed in claim 1 in which said first platen is constituted by a mould portion.

5. An injection moulding machine as claimed in claim 4 in which said lateral plates are attached to said first platen by shear members.

References Cited
UNITED STATES PATENTS

| | | | |
|---|---|---|---|
| 2,744,290 | 5/1956 | Corson | 18—30 |
| 2,841,826 | 7/1958 | Brucker | 18—30 |
| 2,916,768 | 12/1959 | Quere et al. | 18—30 |
| 3,120,039 | 2/1964 | Stubbe et al. | 18—30 |
| 3,156,014 | 11/1964 | Wenger | 18—30 |

FOREIGN PATENTS 510,393  8/1939  Great Britain.

WILBUR L. McBAY, *Primary Examiner.*